United States Patent
Caballero Tapia

(10) Patent No.: US 9,200,680 B2
(45) Date of Patent: Dec. 1, 2015

(54) CLUTCH SUITABLE FOR VEHICLES' POWERED MIRRORS

(71) Applicant: FICO MIRRORS, S.A., Barcelona (ES)

(72) Inventor: Moisés Caballero Tapia, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 0 days.

(21) Appl. No.: 14/043,906

(22) Filed: Oct. 2, 2013

(65) Prior Publication Data

US 2014/0090946 A1    Apr. 3, 2014

(30) Foreign Application Priority Data

Oct. 2, 2012    (EP) ..................................... 12382383

(51) Int. Cl.
| F16D 13/38 | (2006.01) |
| B60R 1/072 | (2006.01) |
| F16D 1/072 | (2006.01) |
| F16D 7/02 | (2006.01) |
| F16D 43/21 | (2006.01) |

(52) U.S. Cl.
CPC ................ F16D 13/38 (2013.01); B60R 1/072 (2013.01); F16D 1/072 (2013.01); F16D 7/024 (2013.01); F16D 7/028 (2013.01); F16D 43/213 (2013.01); F16D 43/218 (2013.01)

(58) Field of Classification Search
USPC .......................... 464/43, 44, 46–48; 192/56.6; 359/872–877
See application file for complete search history.

(56) References Cited

U.S. PATENT DOCUMENTS

| 788,810 | A | * | 5/1905 | Ambler ........................... 464/44 |
| 3,203,268 | A | * | 8/1965 | Manoni et al. .............. 464/46 X |
| 4,883,152 | A | * | 11/1989 | Froment ...................... 464/46 X |
| 7,465,233 | B2 | * | 12/2008 | Tajima et al. |
| 8,127,641 | B2 | * | 3/2012 | Tilg et al. .................. 359/877 X |

FOREIGN PATENT DOCUMENTS

| DE | 2456456 A1 | 8/1976 |
| DE | 102004046625 A1 | 3/2006 |
| EP | 2017127 A1 | 1/2009 |
| GB | 2395452 A | 5/2004 |
| JP | 6-127310 A | * 5/1994 | .................. 359/877 |
| WO | WO 2009/108094 A1 | 9/2009 |

\* cited by examiner

*Primary Examiner* — Gregory Binda
(74) *Attorney, Agent, or Firm* — Jenkins, Wilson, Taylor & Hunt, P.A.

(57) ABSTRACT

A clutch mechanism preferably used in a vehicle door mirror with a high durability and which allows reaching, in a fast and simple way, a preset compression level owing to the existence of two limiting surfaces.

11 Claims, 5 Drawing Sheets

CLUTCH SUITABLE FOR VEHICLES' POWERED MIRRORS

CROSS-REFERENCE TO RELATED APPLICATION

This application claims priority to European Patent Application No. 12382383.3 filed on Oct. 2, 2012 under the provisions of 35 U.S.C. 119. The entire contents of the foregoing European patent application are hereby incorporated by reference herein, for all purposes.

OBJECT OF THE INVENTION

The present invention relates to a clutch suitable for powered mirrors preferably for vehicles. Powered mirrors have electrical motors that orientate the mirror according to the signals commanded by the user. When the mirror reaches the end of stroke the torque of the motor is increased and the gears of other parts of the device can be damaged. Clutches are used to limit the maximum torque applied to the kinematic chain of the device transferring the movement from the motor to the mirror.

When the torque reaches a maximum value, some internal pieces of the clutch slip and the energy is dissipated because the friction of said pieces.

The present invention is characterized in that the configuration of the clutch is very simple allowing a cheaper manufacturing process.

RELATED ART

Devices to adjust the orientation of a mirror are used in vehicle door mirrors. These devices comprise electric motors whose shafts are connected via transmission means with the mirror.

The European Patent application EP2017127 A1 describes a device to adjust the orientation of a vehicle mirror which comprises a housing accommodating a first and a second electric motor and a first and a second gear driven by said first and second motor respectively, a mirror support pivot-mounted at the housing in relation to two pivot axles, at which two gear knees are arranged engaging with said gears, a first gear knee engaging with the first gear to pivot the mirror support around a first pivot axle and a second gear knee engaging with the second gear to pivot the mirror support around a second pivot axle.

This device comprises a clutch mechanism allowing the gears to slip in overload conditions versus a drive shaft wherein the clutch mechanism comprises a elastic washer having a friction face forced against a corresponding friction face on a clutch gear connected to or integral with the input gear of the clutch mechanism which engages with the first or second gear driven by first or second motor.

The previous clutch mechanism also comprises a resilient retainer retaining the elastic washer (or a disc spring) in a compressed condition, wherein the resilient retainer is locked once has been distorted by a mechanical element located in the output gear which transmits the rotation to the gear knee.

In the cited prior art, the resilient retainer is introduced forcing it to exceed some protrusions. If the protrusions are too big then the resilient retainer will be permanently damaged but, if the protrusions are too small then the resilient retainer could exceed back again the protrusions and the elastic washer would be released.

The present invention avoids these drawbacks allowing a more robust clutch and a quick and simple assembly process.

SUMMARY

The present invention relates to a clutch mechanism preferably used in a vehicle door mirror with a high durability and which allows reaching, in a fast and simple way, a preset compression level owing to the configuration. This clutch mechanism comprises:
  a shaft which extends along a longitudinal axis having at least a first contact surface and a first limiting wall in its external surface and an end adapted to be expanded,
  a first body comprising:
    a first gear extended according to the longitudinal axis,
    a first friction surface essentially perpendicular to the longitudinal axis,
    a hole housing a portion of the shaft,
    a second contact surface abutting on the first contact surface of the shaft preventing the displacement of the first body in respect of the shaft at least in one direction,
  a second body comprising:
    a second gear extended according to the longitudinal axis,
    a hole housing a portion of the shaft such that the second body is located, according to the longitudinal axis, between the first body and the end of the shaft adapted to be expanded; and,
      wherein the hole and the shaft have rotational locking means and axial locking means cooperating for locking both bodies, the shaft and the second body; and,
      where the hole also has a cavity adapted to house the expansion of the end of the shaft adapted to be expanded, wherein the shaft is axially locked in respect of the second body by means of the expansion of the end of the shaft,
      where the hole comprises a second limiting wall adapted to abut on the first limiting wall of the shaft.
  a seat located on the second body or on the shaft having second rotational locking means,
  an elastic washer locked by the second rotational locking means of the second body or the shaft in such a way the elastic washer is compressed between said second body and the first friction surface of the first body, the level of compression dependent on the axial displacement of the second body with respect to the shaft, this displacement being determined by the abutment of said first limiting wall of the shaft and said second limiting wall of the second body.

In most applications, the second gear is the input gear driven by the motor. The second gear is rotationally integral with the shaft, for instance by means of a coupling wherein both pieces have a polygonal section.

The shaft, or the second body comprising the second gear driven by the motor, comprises a seat adapted to drive an elastic washer by means of the second rotational locking means.

The shaft is housed within the hole of the first body which has the first gear, in most applications the output gear. The clutch transfers the movement from the second gear to the first gear throughout frictional forces. The first body having the first gear also has a first friction surface adapted to be pressed by the elastic washer. The torque applied to the second gear is transferred to the first gear because the frictional force between the washer and the first friction surface but, if the maximum frictional force is reached then the washer slips on the friction surface limiting the maximum torque.

According to the longitudinal axis, the first body cannot be displaced in the axial direction because the second contact surface of the first body is abutting on the first contact surface of the shaft.

Before assembling the clutch, the second body is axially displaced along the shaft until the abutment of the first limiting wall of the shaft and the second limiting wall of the second body happens. Then, since the pressure exerted on the washer is the one that yields the maximum torque that must be transferred by the clutch, the second body and the shaft are joined, for instance by welding both pieces.

Welding process expands the end of the shaft avoiding the second body to be released. The second body has a cavity located, according to the longitudinal axis, at the location of the expandable region of the end of the shaft. When the end of the shaft is expanded, the expanded region is housed in the cavity and provides a wider diameter preventing the axial displacement of the first body in respect of the shaft maintaining the pressure of the elastic washer.

The claimed invention allows providing a preset value of pressure to the elastic washer during the welding process avoiding modifying the shape of the shaft or of any other piece.

DESCRIPTION OF THE DRAWINGS

The invention will be now described more in detail with reference to the accompanying drawings given by way of illustrative and non-limiting example, wherein.

DETAILED DESCRIPTION OF THE INVENTION

The present invention, according to its first inventive aspect, is a clutch suitable for powered mirrors whose central element is a shaft (1); this shaft (1) is the reference element that establishes the relative position of other elements of the clutch, such as the first body (4) and the second body (2). Its longitudinal axis, named as axis (X), is also the reference used to define the particular configurations and orientation of the clutch parts.

Figure 1:
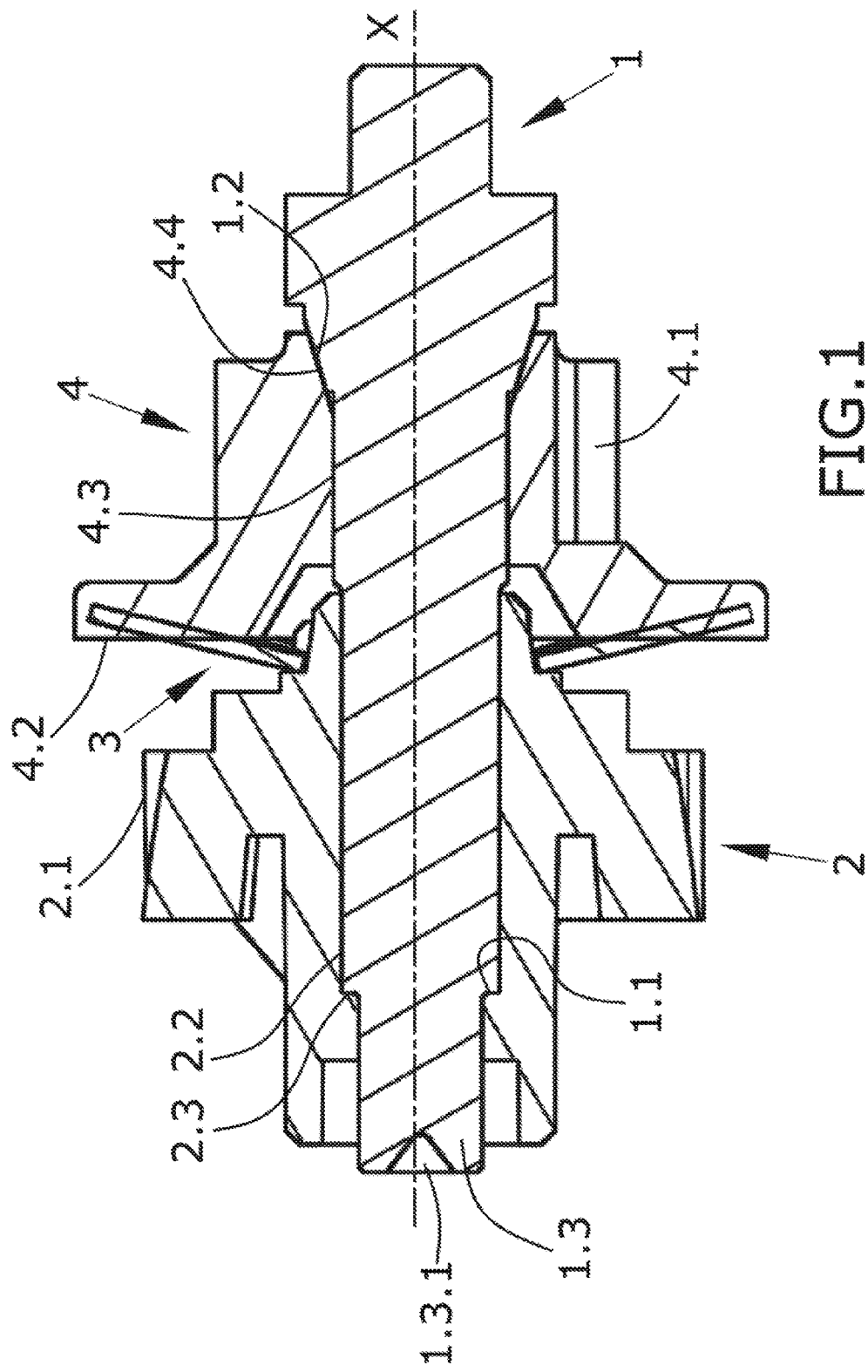
FIG. 1 is a view of the longitudinal section of the device which comprises the axis of the shaft, at a moment previous to the expansion of the end of the shaft adapted to be expanded.
Figure 2:
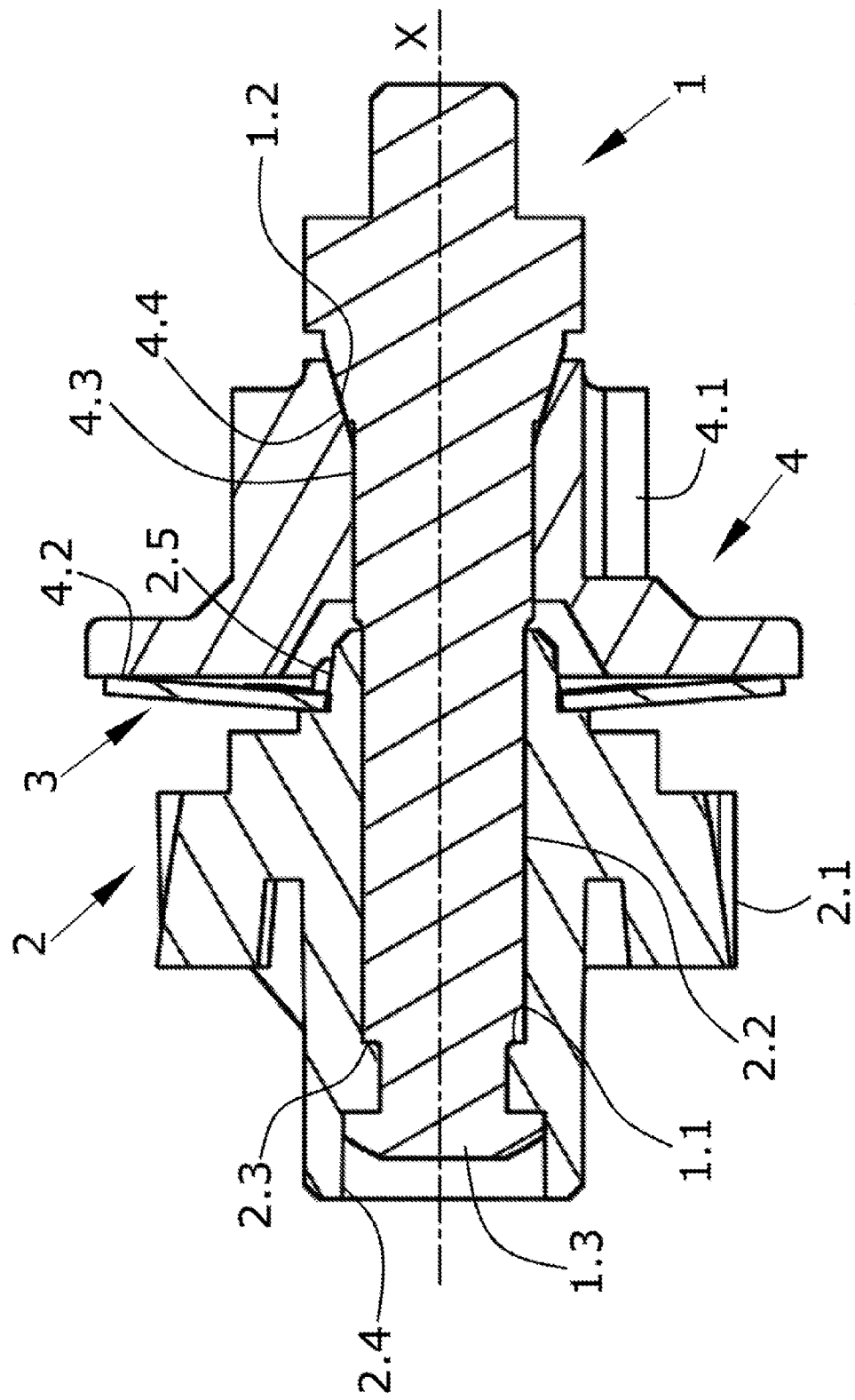
FIG. 2 is a view of the longitudinal section of the device which comprises the axis of the shaft, at a moment after the expansion of the end of the shaft adapted to be expanded.

As can be seen in the embodiment shown in FIG. 1, one of the distal ends of the shaft (1), concretely the one located on the left-hand side of this figure, is an end (1.3) of the shaft (1) adapted to be expanded. In the example of FIG. 1, this end has an inner conical cavity (1.3.1) which can be used for said expansion, for example by means of the introduction of an ultrasound device which induces a welding process or of a welding tip. FIG. 2, on the contrary, shows this end (1.3) of the shaft (1) once the expansion has taken place and therefore the axial movement along the axis (X) is not possible. Thus, the expandable end of the shaft can be arranged to be expanded by application of ultrasonic energy.

The shaft (1) does also comprise, in its end opposite to the end (1.3) of the shaft (1) adapted to be expanded, a first contact surface (1.2) that limits the movement of the first body (4) along the axis (X) in the direction opposite to said end (1.3) of the shaft (1) adapted to be expanded. In the particular embodiment of FIGS. 1 and 2, both the first contact surface (1.2) of the shaft (1) and the second contact surface (4.4) of the first body (4) have conical shape and the limitation of relative movement in one direction is a consequence of the wedging between these surfaces.

The shaft (1) is integral with second body (2), which comprises the second gear (2.1), that is, the input gear. The first body (4) comprises a first gear (4.1). This gear transmits the output torque. The first body (4) and the shaft (1) are not rotationally integral, they have to be able to rotate freely one with respect to the other; otherwise, the input torque supported by the second gear (2.1) of the second body (2) would be entirely transmitted to the first gear (4.1) regardless of the value of the torque.

With the present clutch, the input torque is transmitted to the first gear (4.1) when the torque is below a predetermined threshold value preventing the output torque from surpassing a value that could be damaging, for example, for the mechanism of a door mirror.

If input torque reaches the threshold value then the output torque is limited and part of the input energy is dissipated due to friction between internal parts as described later. This limited transmission of torque is achieved because an elastic washer (3) is the part that links the rotational movements of the second body (2), rotationally integral with the shaft (1), and the first body (4).

Regarding the link between the elastic washer (3) and the second body (2), this elastic washer (3) is rotationally integral with the second body (2) and the shaft (1), since it is locked by second rotational locking means (2.5) of a seat located at the shaft (1) or at the second body (2).

Moreover, regarding the link between the elastic washer (3) and the first body (4), the elastic washer (3) is in frictional contact with the first friction surface (4.2) of the first body (4). Depending on the contact force of the elastic washer (3) against the first friction surface (4.2), the threshold value of the torque will also vary. The larger the contact force, the higher the threshold value is.

The set of pieces formed by the shaft (1), the second body (2) and the elastic washer (3) transmit the torque to the first body (4). In this embodiment, the transmission is carried out mainly by means of the frictional force between the elastic washer (3) and the first friction surface (4.2) and the frictional force between the first contact surface (1.2) of the shaft (1) and the second contact surface (4.4) of the first body (4).

Both the first body (4) and the second body (2) are, as can be inferred from what have been explained and as can be seen in FIGS. 1 and 2, hollow in their central part so as to house the shaft (1). These holes are referred to in these figures as hole (2.2) of the second body (2) and hole (4.3) of the first body (4). The hole (2.2) of the second body (2) has in its left distal end, referring to FIGS. 1 and 2, a cavity (2.4) where the end (1.3) of the shaft (1) adapted to be expanded fits, so that the shaft (1) remains axially locked with respect to the second body (2) when the expansion actually happens.

Figure 3:
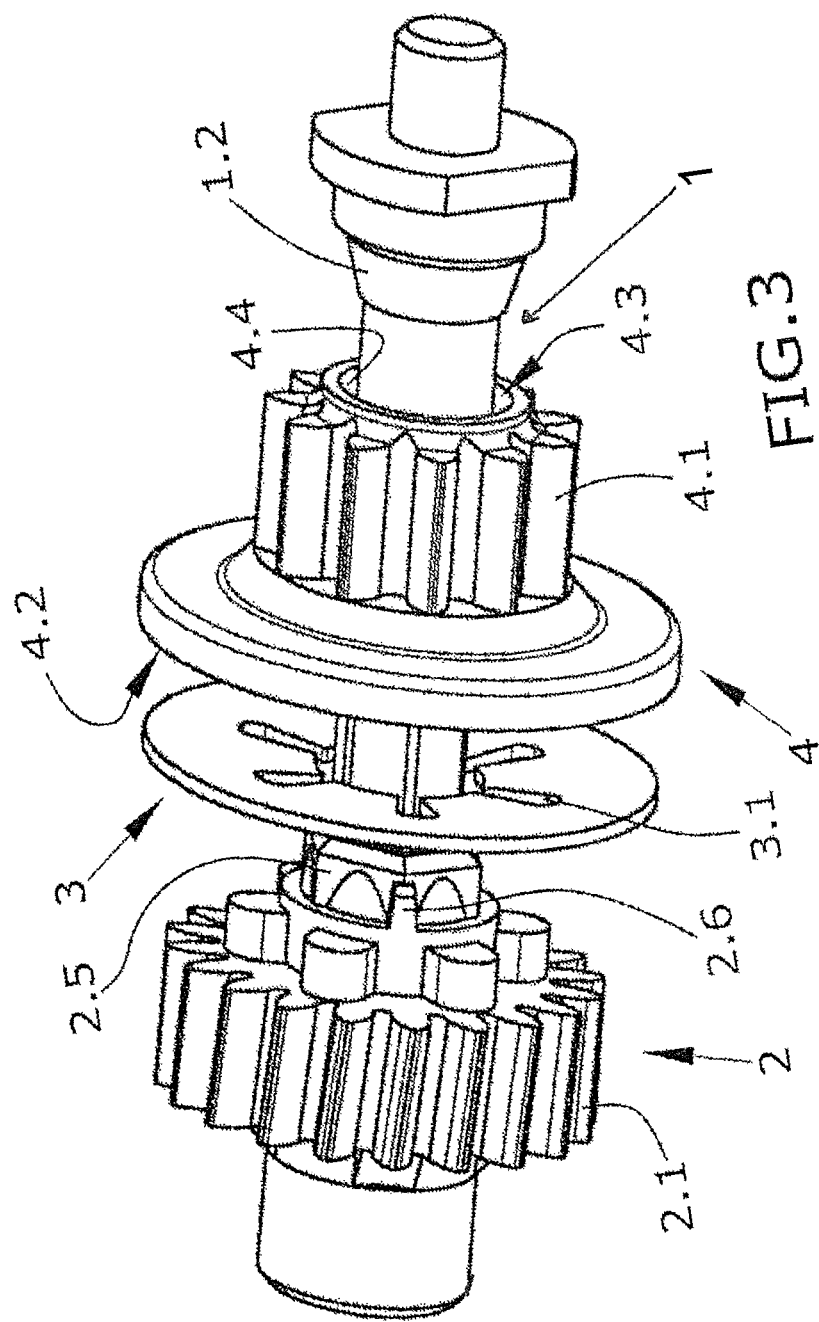
FIG. 3 is a general lateral perspective partially exploded view of the device.

As has also been said, the shaft (1) and the second body (2) are rotationally integral, contrary to the shaft (1) and the first body (4), for which the hole (2.2) of said second body (2) and the shaft (1) have rotational locking means. In the non-limiting embodiment of FIG. 3, this rotational locking means shows a polygonal shape of said hole (2.2) and said shaft (1), which obviously impede their relative rotational movement. In this FIG. 3, it can also be observed that the hole (4.3) of the first body (4) and the portion of the shaft (1) housed in it are circular to permit their relative rotational movement. In an even more concrete example of embodiment, this polygonal shape is a hexagon, as in the case of FIG. 3.

Figure 4:
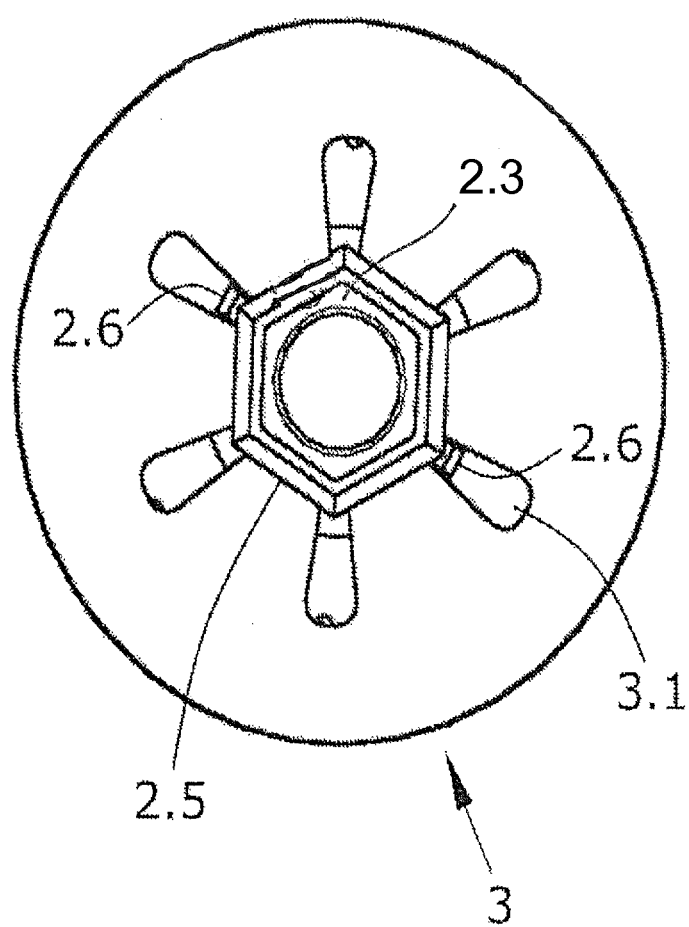
FIG. 4 is a top view of an elastic washer comprising slots to house of the ribs of the seat of the shaft or of the second body so as to reinforce the rotational locking. Shaft and first body are not shown in this figure for achieving a better view.
Figure 5:
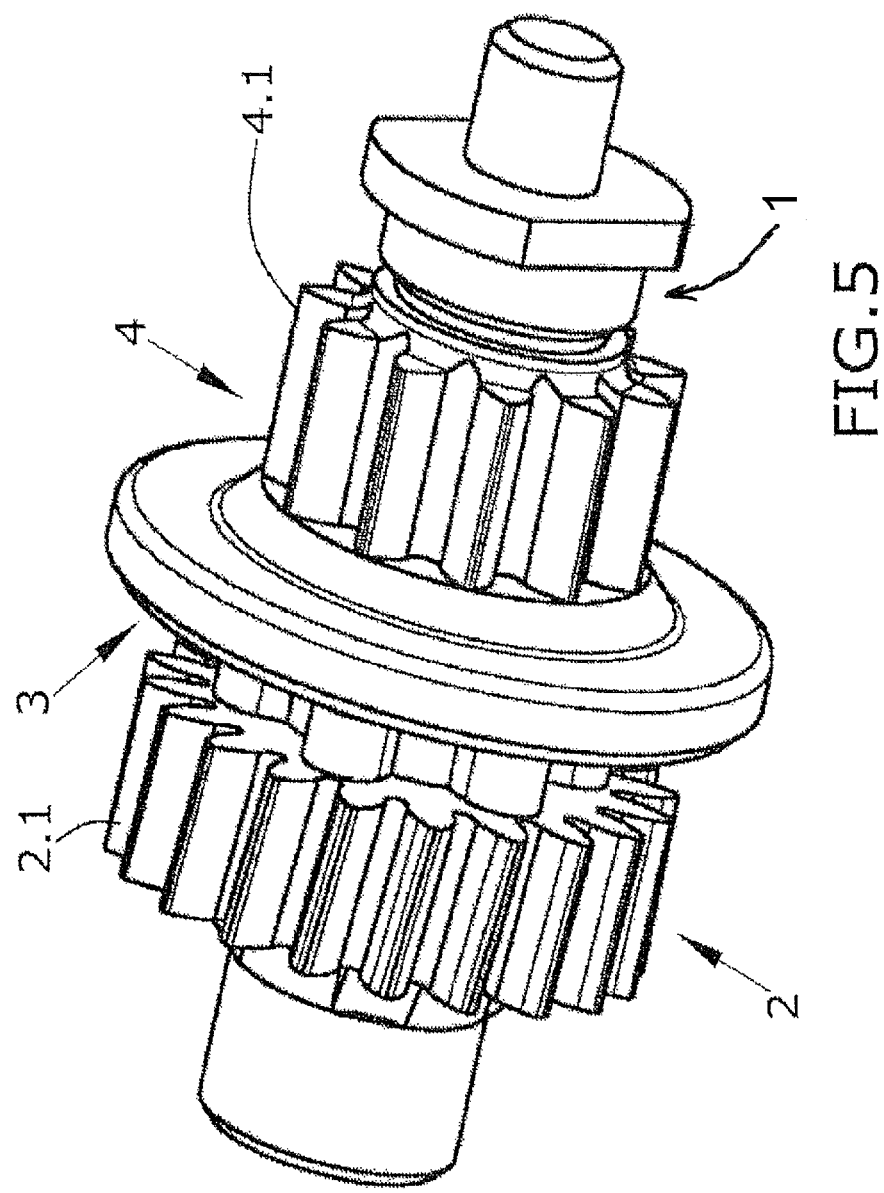
FIG. 5 is a general view of the device representing the transmission of torque between both gears when the elastic washer is compressed between the second body and the first friction surface.

Similarly, the above defined second rotational locking means (2.5) are located at a seat on the shaft (1) or on the second body (2), which keeps the washer (3) rotationally integral with these parts; in an embodiment, the shape of both the seat and the internal hollow part of the washer (3) is polygonal. This polygon, as in the previous paragraph, can be a hexagon, as in the embodiment shown in FIGS. 3 and 4. In this last embodiment, moreover, the elastic washer (3) comprises a plurality of slots (3.1), shown in FIGS. 3 and 4, and the seat of the second body (2) or the shaft (1) has a plurality of ribs (2.6), also shown in FIGS. 2 and 3, which fit said slots to improve and reinforce the rotational locking.

During the manufacturing of the clutch, the shaft (1) is housed in the hole (2.2) of the second body (2) by an axial displacement until the elastic washer (3) is compressed. The shaft (1) has a first limiting wall (1.1) and the second body (2) has a second limiting wall (2.3), as can be seen in FIGS. 1 and 2, and they abut limiting the displacement of second body (2) with respect to the shaft (1) in the direction opposite to the end (1.3) adapted to be expanded of the shaft (1). The technical advantage of this configuration is that it allows a quick assembly of these two parts before the welding and not complex control means are required for adjusting the axial displacement, in such a way that the degree of compression is predetermined during the design of the dimensions of the clutch—as this shoulder formed by the limiting walls limits the displacement of the second body (2) towards the washer (3), when the walls (1.1, 2.3) abut the preset compression of the washer (3), and thus the maximum preset transmission of torque, are achieved. This configuration, as a result of this, presents the technical advantage of allowing a quick assembly and yielding a predetermined maximum transmission of torque, without the need for a careful control of the assembly process.

The invention claimed is:

1. A clutch suitable for powered mirrors, the clutch comprising:
 a shaft which extends along a longitudinal axis having at least a first contact surface and a first limiting wall in its external surface and an expanded end;
 a first body comprising:
  a first gear extended according to the longitudinal axis,
  a first friction surface essentially perpendicular to the longitudinal axis,
  a first hole housing a portion of the shaft, and
  a second contact surface abutting on the first contact surface of the shaft preventing displacement of the first body in respect of the shaft in at least in one direction;
 a second body comprising:
  a second gear extended according to the longitudinal axis, and
  a second hole housing a portion of the shaft such that the second body is located, according to the longitudinal axis, between the first body and the expanded end of the shaft;
  wherein the second hole and the shaft have at least one first rotational locking element and at least one axial locking element cooperating for locking the shaft and the second body;
  wherein the second hole also has a cavity adapted to house the expansion of the expanded end of the shaft, wherein the shaft is axially locked in respect of the second body by the expanded end of the shaft, and
  wherein the second hole comprises a second limiting wall adapted to abut the first limiting wall of the shaft;
 a seat located on the second body or on the shaft and having at least one second rotational locking element; and
 an elastic washer locked by the at least one second rotational locking element of the second body or the shaft in such a way the elastic washer is compressed between said second body and the first friction surface of the first body, the level of compression being dependent on the axial displacement of the second body with respect to the shaft, this displacement being determined by abutment of said first limiting wall of the shaft and said second limiting wall of the second body.

2. A clutch according to claim 1 wherein each of the first contact surface and the second contact surface comprises a conical friction surface.

3. A clutch according to claim 2 wherein the shaft and the second hole of the second body have a polygonal shape embodying the at least one first rotational locking element.

4. A clutch according to claim 1 wherein the shaft and the second hole of the second body have a polygonal shape embodying the at least one first rotational locking element.

5. A clutch according to claim 4 wherein the polygonal shape is hexagonal.

6. A clutch according to claim 1 wherein the seat has a polygonal shape embodying the at least one second rotational locking element, and the elastic washer also has a polygonal shape corresponding to the polygonal shape of the at least one second rotational locking element.

7. A clutch according to claim 6 wherein the polygonal shape of each of the seat and the elastic washer is hexagonal.

8. A clutch according to claim 6 wherein the seat has a plurality of ribs, the elastic washer comprises a plurality of slots, and the ribs are housed in the slots to improve rotational locking between the seat and the elastic washer.

9. A clutch according to claim 1 wherein the expanded end of the shaft has a conical cavity prior to expansion of the expanded end.

10. A clutch according to claim 9 wherein the expanded end of the shaft is expanded by application of ultrasonic energy.

11. A clutch according to claim 1 wherein the expanded end of the shaft is expanded by application of ultrasonic energy.

* * * * *